United States Patent
Litorell (10) Patent No.: US 6,848,403 B2
(45) Date of Patent: Feb. 1, 2005

(54) INTERNAL COMBUSTION ENGINE

(75) Inventor: Martin Litorell, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/779,409

(22) Filed: Feb. 13, 2004

(65) Prior Publication Data

US 2004/0159295 A1 Aug. 19, 2004

(30) Foreign Application Priority Data

Feb. 17, 2003 (EP) .......................................... 03003568

(51) Int. Cl.[7] .............................................. F01L 1/34
(52) U.S. Cl. .................................. 123/90.16; 123/90.15
(58) Field of Search ............................ 123/90.15, 90.16

(56) References Cited

U.S. PATENT DOCUMENTS

| | | | |
|---|---|---|---|
| 5,603,293 A | 2/1997 | Schwarzenthal et al. | |
| 5,950,583 A | 9/1999 | Kraxner et al. | |
| 6,332,445 B1 | 12/2001 | Voss et al. | |
| 6,474,278 B1 | * 11/2002 | Davis et al. | ............. 123/90.15 |

FOREIGN PATENT DOCUMENTS

| | | |
|---|---|---|
| DE | 19632651 | 2/1998 |
| EP | 0779411 | 5/2001 |

* cited by examiner

*Primary Examiner*—Thomas Denion
*Assistant Examiner*—Zelalem Eshete
(74) *Attorney, Agent, or Firm*—Donald J. Lewis; Allan J. Lippa (57) ABSTRACT

An internal combustion engine is presented, in which the valves (11) are adapted to be actuated by a valve actuation arrangement (12), the valve actuation arrangement (12) comprising actuation adjustment mechanisms (17), adapted to assume a first position whereby the valves can be actuated according to a first valve lift mode, and to assume a second position whereby the valves can be actuated according to a second valve lift mode. Further, the position the actuation adjustment mechanisms (17) at a first set of cylinders is controllable through a first mechanism control system (22), and the position of the actuation adjustment mechanisms (17) at a second set of cylinders is controllable through a second mechanism control system (23), whereby the first set of cylinders consists of cylinders which are consecutive in a firing sequence, during operation of the engine according to at least one engine operation mode.

13 Claims, 7 Drawing Sheets

INTERNAL COMBUSTION ENGINE

TECHNICAL FIELD

The present invention relates to an internal combustion engine provided with a valve control mechanism.

BACKGROUND

In known art of internal combustion engines, a number of designs have been suggested for accomplishing valve drives, for inlet and/or exhaust valves, than can shift between different valve lift modes, at which the valve lift curves differ from each other. Shifts between said modes are usually accomplished through mechanical arrangements at the valve tappets.

There must be a high degree of certainty that shifts between the valve modes are not effected during certain critical stages of the valve lift operation. A reason for this is to avoid risks of damages occurring in the engine. Another reason is that it has to be possible to predict for each cylinder the cycle in which the mode shift is effected. If a mode shift is effected in a cycle different to the predicted cycle, there could be a lack of coordination between the valve lift and other parameters, such as the amount of air to be inducted, which in turn could result in a misfire. Therefore, it has to be made certain that mode shifts are effected in certain trigger windows between each valve lift process of the engine. These windows are usually relatively small, and at high engine speeds their time duration can be very small, increasing the risk, due to inaccuracy of the system, of a mode shift being effected at a critical stage of the valve train or in a cycle not predicted.

SUMMARY

It is an object of the present invention to reduce the risk of damages of an internal combustion engine adapted to run selectively in different modes regarding the lift characteristics of valves of the engine.

It is also an object of the invention to secure a smooth operation of the engine and decrease the risk of discomfort for the driver and passengers of a vehicle due to disturbances in the engine operation.

These objects are reached with an internal combustion engine with a plurality of cylinders, at least one valve at each cylinder being adapted to be actuated by a valve actuation arrangement, the valve actuation arrangement comprising at least two actuation adjustment mechanisms, each adapted to assume a first position whereby at least one of the valves can be actuated according to a first valve lift mode, and to assume a second position whereby at least one of the valves can be actuated according to a second valve lift mode, the position of at least one actuation adjustment mechanism for at least one valve at a first set of cylinders being controllable through a first mechanism control system. The position of at least one actuation adjustment mechanism for at least one valve at a second set of cylinders is controllable through a second mechanism control system, whereby the first set of cylinders consists of cylinders which are consecutive in a firing sequence, during operation of the engine according to at least one engine operation mode.

Since separate control systems for the actuation adjustment mechanisms are provided for separate sets of cylinders, and a set of cylinders is correlated with the firing or ignition sequence of the engine so that ignition takes place consecutively in the set of cylinders, there are large trigger windows provided for activating the actuation adjustment mechanisms at one set of cylinders while ignitions are taking place in another set of cylinders.

BRIEF DESCRIPTION OF DRAWINGS

Below the invention will be described closer with the aid of the drawing, in which.

DETAILED DESCRIPTION

Figure 1:
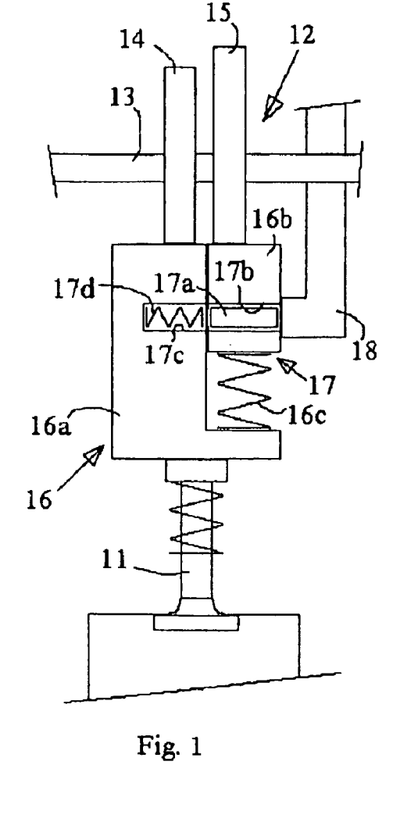
FIGS. 1, 2 and 3 show schematically, an arrangement at a cylinder in an internal combustion engine.

FIG. 1 shows schematically, an arrangement at a cylinder in an internal combustion engine. The engine comprises six cylinders arranged essentially along a straight line. The cylinders could be provided with ignition means in each cylinder, e.g., in the form of one or more sparkplugs, or the engine could be adapted for compression ignition. At each cylinder one, two or more intake valves, and also one, two or more exhaust valves are provided. For simplicity of this presentation, in FIG. 1 only one valve 11 is shown. The valve 11 is adapted to be actuated by a valve actuation arrangement 12 including a camshaft 13. FIG. 1 shows a part of the valve actuation arrangement 12 and the valve 11 in positions at which the valve is not lifted. Here it is assumed that all valves in each cylinder are actuated by a camshaft, but it is also possible that only one or some of the valves are camshaft driven, and others actuated in other ways, e.g., electromagnetically. It is also possible that two or more camshafts are used, each for different valves in each cylinder and/or valves in different cylinders.

The valve actuation arrangement 12 includes cam lobes 14, 15 on the camshaft 13 and tappets 16 at each valve 11, arranged between the camshaft 13 and the valves 11 and each adapted to transfer movements from the camshaft to the respective valve 11. It is also possible that one, some, or all of the tappets 16 are adapted to transfer movements to more than one valve each.

The engine is adapted to run selectively in two valve lift modes, differing regarding the valve lift characteristics influencing the duration of and/or the distance of the valve motion, i.e., the lift. The invention is also applicable to engines adapted to run in more than two valve lift modes. The valve actuation arrangement 12 includes actuation adjustment mechanisms 17, each arranged at a tappet 16, described closer below. Each actuation adjustment mechanism 17 is adapted to adjust the respective tappet 16 so as to effect shifts from one valve lift mode to another.

In addition to different valve lift modes, the engine can be adapted to run in different operation modes. The latter can include stroke modes, such as a four-stroke mode or an eight-stroke mode. In an engine with camshaft actuated valves, an eight stroke mode can be achieved with cylinder deactivation, as is known in the art. The invention is also applicable to engines where all valves are actuated independently of the crankshaft. As an example, the valve actuation arrangement can include devices for electromagnetic actuation of the valves. Even if the valves are actuated independently of the crankshaft, the valve actuation arrangement can include actuation adjustment mechanisms for shifting between different valve lift modes. In an engine where the valves are actuated independently of the crankshaft, many different engine operation modes in the form of stroke modes can be achieved, e.g. two, four, six, eight, twelve or sixteen stroke mode.

FIG. 1 shows schematically a valve 11 and a part of the valve actuation arrangement 12 in positions at which the valve is not lifted. The valve actuation arrangement 12 includes for each valve a first cam lobe, herein referred to as a low lift cam lobe 14, and a second cam lobe, herein referred to as a high lift cam lobe 15, on the camshaft 13. The high lift cam lobe 15 has a larger eccentric than the low lift cam lobe 14. The high lift cam lobe 15 can also, or alternatively, have a different profile than the low lift cam lobe 14 so as to provide for different valve lift characteristics during parts or the whole lifting process, and also a different duration and/or timing of lifting process.

The tappet 16 comprises two parts, a main part 16a and an additional part, herein referred to as a high lift part 16b, whereby the high lift part 16b is movable in relation to the main part 16a in direction perpendicular to the camshaft 13, and biased towards the camshaft by means of a spring 16c. The actuation adjustment mechanism 17 can assume a first position in which a first valve lift mode, in this example also called a low lift mode, can be effected. The actuation adjustment mechanism 17 includes a locking device comprising a locking pin 17a. In the first position of the actuation adjustment mechanism 17 the locking pin 17a is located in a first space 17b, with a delimitation having an elongated shape, in the high lift part 16b. Thereby, the locking device is in an unlocked position.

Figure 2:
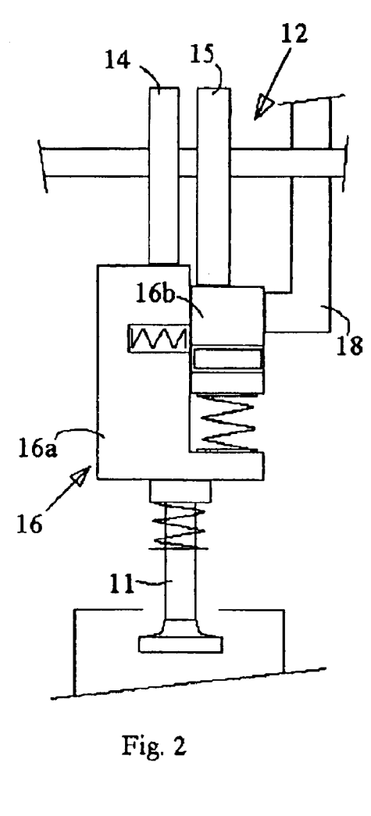

FIG. 2 shows schematically the valve 11 and a part of the valve actuation arrangement 12 at maximum lift of the valve 11 in the low lift mode. The low lift cam lobe 14 pushes the tappet 16 and the valve 11, at which the high lift cam lobe 15 pushes the high lift part 16b along the main part 16a, without acting on the valve 11.

Referring to FIG. 1, the locking pin 17a can be moved into a second space 17c in the main part 16a with hydraulic pressure provided through an oil gallery 18 of a mechanism control system, a part of which is shown in FIG. 1 and which communicates, at least when the valve is not lifted, with the first space 17b. To shift from the first valve lift mode to a second valve lift mode, in this example referred to as high lift mode, the locking pin is moved by hydraulic pressure, provided through the oil gallery 18, partly into the second space 17c, for the actuation adjustment mechanism 17 to assume a second position, here a locking position. Thereby, the high lift part 16b is locked to the main part 16a.

A spring 17d provides for moving the locking pin 17a out of the second space 17c when the hydraulic pressure is released. Thereby, a shift from the high lift to the low lift mode is possible. Alternatively, the locking pin can be moved out of the second space 17c by hydraulic pressure in an additional oil gallery that communicates with the second space 17c.

Figure 3:
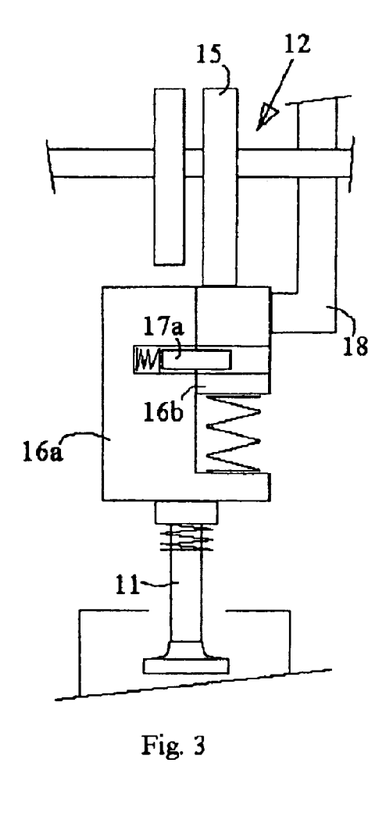

FIG. 3 shows schematically the valve 11 and a part of the valve actuation arrangement 12 at maximum lift of the valve 11 in the high lift mode. The high lift cam lobe 15 acts on the valve 11 via the high lift part 16b, the locking pin 17a, and the main part 16a. The valve actuation arrangement in FIGS. 1, 2 and 3 corresponds schematically to a CPS (Cam Profile Shifting) system.

As can be understood from the above, a shift of valve modes can not be effectuated when the valve is in the process of lifting, since parts of the actuation adjustment mechanism 17, i.e., the locking pin 17a, the first space 17b, and the second space 17c, have to be positioned properly in relation to each other for the locking pin to move in or out of the locking position. Also, if a shift from the low to the high lift mode is attempted during the initial phase of the lifting process of a valve, referring to FIG. 1, the relative movement between the main part 16a and the high lift part 16b and the simultaneous movement of the locking pin 17a towards the second space 17c could result in excessive wear or damages of certain parts. This problem is present in all valve actuation arrangements, where shifting between different valve lift modes are effected by means of locking mechanisms, different parts of which move in relation to each other during valve lift processes.

Thus, the valve mode shifts have to be effected during crankshaft angle intervals between the valve lift processes, or at least between critical stages of the valve lift processes. In the example above, such a critical stage is when different parts, i.e., referring to FIG. 1, the main part 16a and the high lift part 16b of each actuation adjustment mechanism start moving in relation to each other. Typically, in CPS system such a critical stage including safety margins is approximately 10 CA (crankshaft angle degrees). However, the duration of the critical stage can vary depending on the type of actuation adjustment mechanism used, or the tolerances in the valve train. In a four-stroke operation mode of a six-cylinder engine there is, at least on average, 120 CA between each intake valve actuation or each exhaust valve actuation. Then, if the oil gallery 18 (FIG. 1) communicates with actuation adjustment mechanisms of all cylinders, there are windows of approximately 110 CA in which mode shifts can be carried out. This is a relatively small interval which put high demands on accuracy of any control system for the actuation adjustment mechanisms.

If there are two parts of a hydraulic system, or two hydraulic systems, that can be controlled separately and each of which communicates through respective oil galleries with actuation adjustment mechanisms of a separate set of cylinders, the windows for valve lift mode shifts can be larger. We assume that in an inline six-cylinder engine, the cylinders being denoted 1, 2, 3, 4, 5, 6, corresponding to their relative spatial position, one set comprises cylinders 1, 2 and 3, and another set comprises cylinders 4, 5 and 6, and also that the ignition sequence of the engine is 1-5-3-6-2-4. Then, in a four-stroke operation mode of the engine there is in each set, at least on average, 240 CA between initiations of the valve lift processes, which leaves windows of 230 CA for mode switch operations, if critical stages of the valve lift processes are taken into account.

Figure 4:
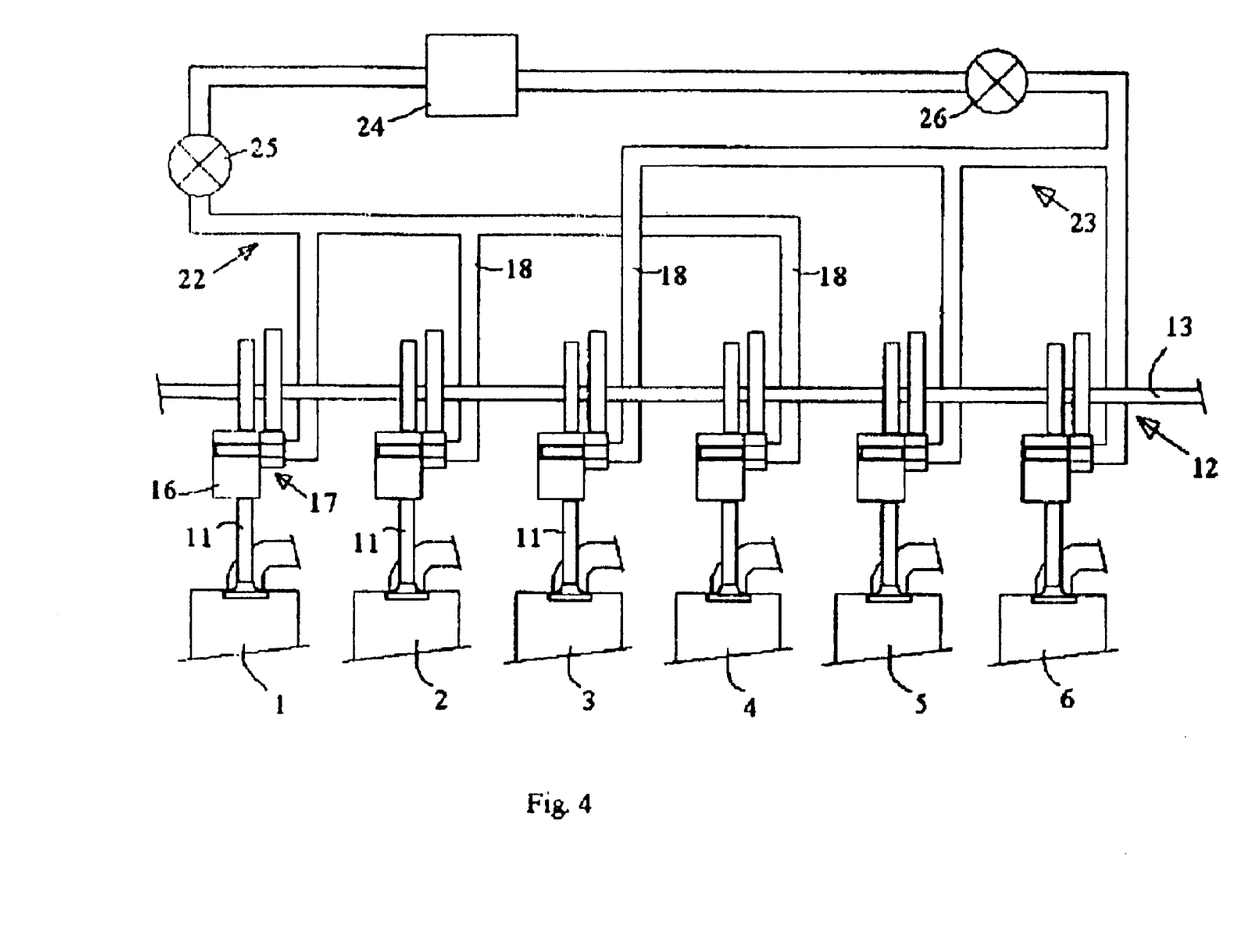
FIG. 4 shows a schematic view of a part of an internal combustion engine according to one embodiment of the invention.

FIG. 4 shows a schematic view of a part of the internal combustion engine according to one embodiment of the invention, and including the arrangement shown in FIGS. 1, 2, and 3. As mentioned, the six cylinders 1, 2, 3, 4, 5, 6 are arranged essentially along a straight line. A hydraulic system includes a first sub system 22, herein also referred to as a first mechanism control system 22, and a second sub system 23, herein also referred to as a second mechanism control system 23, both adapted to be pressurized by a common hydraulic pump 24. Alternatively, the first mechanism control system 22 and the second mechanism control system 23 could be respective parts of two separate hydraulic systems.

As an alternative, each actuation adjustment mechanism 17 could be electromagnetic arrangements, whereby the first and the second mechanism control system 22, 23 could be provided as electric systems.

Each mechanism control system 22, 23 communicates with the actuation adjustment mechanisms 17 at a respective set of the cylinders. The first mechanism control system 22 and the second mechanism control system 23 include a first 25 and a second control valve 26, respectively, to control the pressure in the oil galleries 18. Suitably, the first and second control valves 25, 26 are solenoid valves controllable through signals from a control system of the engine.

According to the invention, the sets of cylinders are arranged in view of the ignition sequence of the engine. In this example the ignition sequence of the engine in a four-stroke mode is 1-5-3-6-2-4, which is a standard sequence for inline six cylinder engines. A first set of cylinders, controllable through the first mechanism control system 22, includes two cylinders 1, 2 closest to a first end of the row of cylinders, and the fourth cylinder 4 in relation to the first end of the row of cylinders. A second set of cylinders, controllable through the second mechanism control system 23, includes two cylinders 5, 6 closest to a second end of the row of cylinders, and the third cylinder 3 in relation to the first end of the row of cylinders. This means that the first set of cylinders 1, 2, 4 is adapted so that each ignition in a cylinder of the first set 1, 2, 4 is preceded and/or followed by an ignition in a cylinder of the first set 1, 2, 4, without any intermediate ignition in the second set of cylinders. Similarly, the second set of cylinders 3, 5, 6 is adapted so that each ignition in a cylinder of the second set 3, 5, 6 is preceded and/or followed by an ignition in a cylinder of the second set 3, 5, 6, without any intermediate ignition in the first set of cylinders. In other words, each set of cylinders consists of cylinders which are consecutive in a firing sequence. Thereby, at least one cylinder of the second set of cylinders is positioned between two cylinders of the first set of cylinders, and at least one cylinder of the first set of cylinders is positioned between two cylinders of the second set of cylinders.

Figure 5:
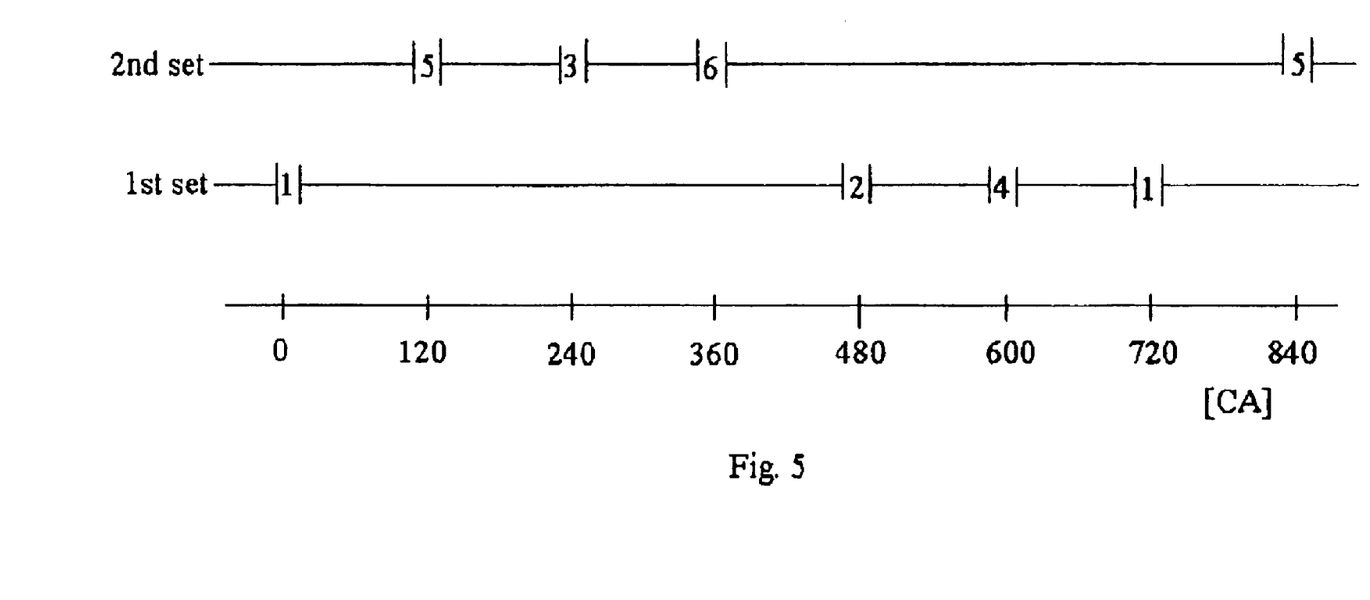
FIG. 5 shows a diagram showing critical stages of the valve lift processes of the engine from FIG. 4.

To clarify the advantage of the invention, FIG. 5 shows a diagram of valve lift processes in the engine partly depicted in FIG. 4. The diagram shows critical stages of the valve lift processes in actuation adjustment mechanisms of each set of cylinders, indicated with the cylinder number at respective crankshaft angles. It can be seen that in each four-stroke cycle and for each set of cylinders there is one large window, also called trigger window, of approximately 470 CA, if a duration of 10 CA is assumed. Thereby, if a valve lift mode shift is requested, this can be effected by activating the first mechanism control system 22 during an interval between critical stages at the first and the second cylinder 1, 2, and activating the second mechanism control system 23 during an interval between critical stages at the sixth and the fifth cylinder 6, 5.

The large windows in the CA domain for effecting valve lift mode shifts, achieved by the invention, drastically reduces risks of triggering a mode shift at the wrong moment. This will reduce risks of damages occurring in the engine, especially in the valve trains, due to a mode shift being effected during a critical stage of the valve lifting process. The large windows achieved will also increase considerably the predictability for each cylinder of the cycle in which the mode shift will be effected. This will substantially reduce the risk of a mode shift being effected in a cycle different to the predicted cycle, which could result in a lack of coordination between the valve lift and other parameters, such as the amount of air to be inducted, which in turn could result in a misfire. The large windows achieved by the invention allows for relatively low tolerances and relatively large inaccuracies in the action of the mode shift arrangement, which can simplify the design thereof and lower production costs.

Figure 6:
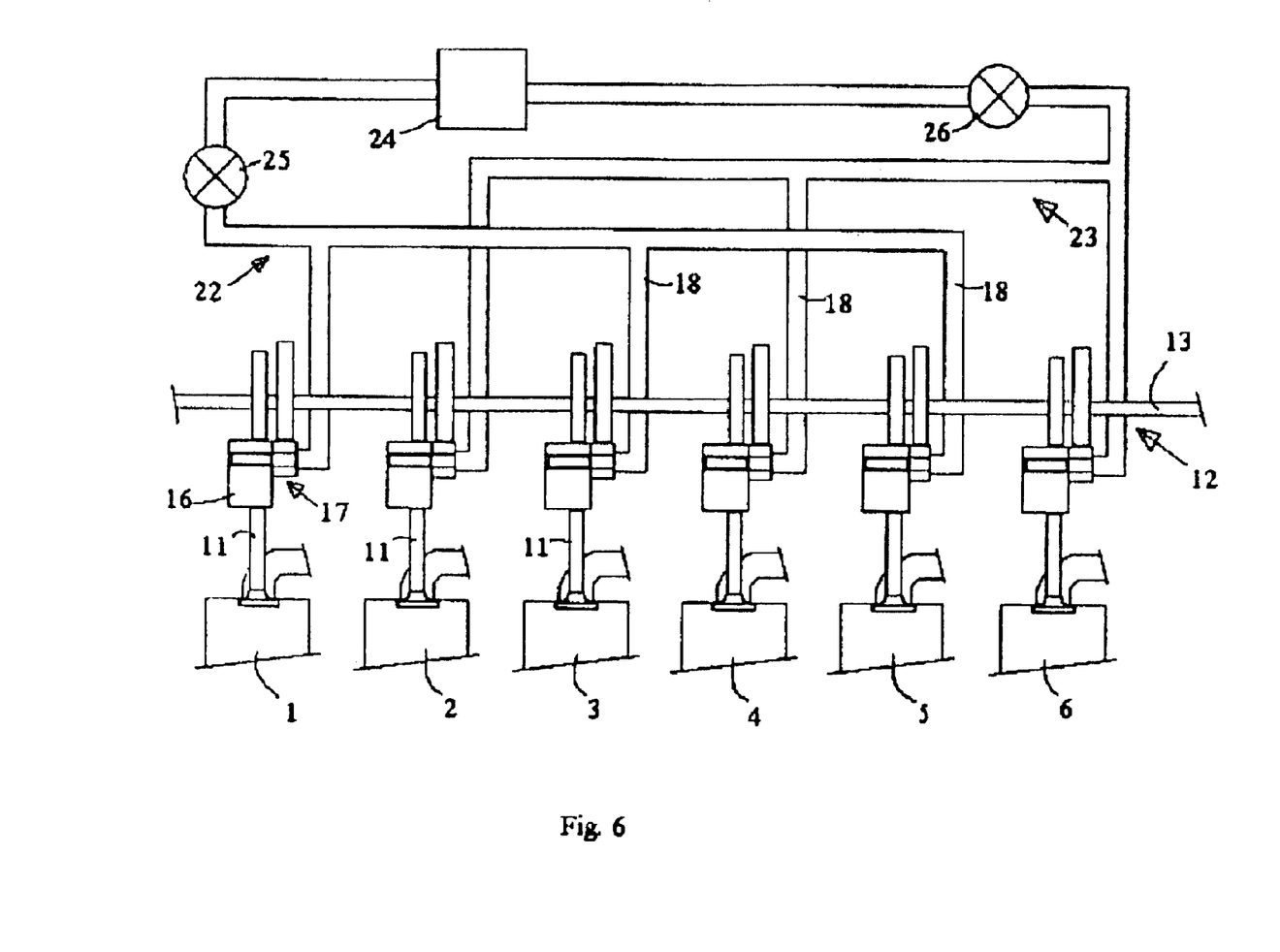
FIG. 6 shows a schematic view of a part of an internal combustion engine according to another embodiment of the invention.

FIG. 6 shows a schematic view of a part of the internal combustion engine according to an alternative embodiment of the invention, and including the arrangement shown in FIGS. 1, 2, and 3. As in the example described with reference to FIG. 4, here there are six cylinders 1, 2, 3, 4, 5, 6 are arranged essentially along a straight line, a hydraulic system, with a first mechanism control system 22 and a second mechanism control system 23 both adapted to be pressurized by a common hydraulic pump 24. As described above, each mechanism control system 22, 23 communicates with the actuation adjustment mechanisms 17 at a respective set of the cylinders, and the first mechanism control system 22 and the second mechanism control system 23 includes a first 25 and a second control valve 26, respectively.

The ignition sequence of the engine is the same as above, i.e., 1-5-3-6-2-4. Differing from the example above, here a first set of cylinders, controllable through the first mechanism control system 22, includes the first, third and fifth cylinder 1, 3, 5 in relation to a first end of the row of cylinders. A second set of cylinders, controllable through the second mechanism control system 23, includes the second, fourth and sixth cylinder 2, 4, 6 in relation to the first end of the row of cylinders. Thereby, the first set of cylinders 1, 3, 5 is adapted so that each ignition in a cylinder of the first set 1, 3, 5 is preceded and/or followed by an ignition in a cylinder of the first set 1, 3, 5, without any intermediate ignition in the second set of cylinders. Similarly, the second set of cylinders 2, 4, 6 is adapted so that each ignition in a cylinder of the second set 2, 4, 6 is preceded and/or followed by an ignition in a cylinder of the second set 2, 4, 6, without any intermediate ignition in the first set of cylinders. In other words, each set of cylinders consists of cylinders which are consecutive in a firing sequence.

Figure 7:
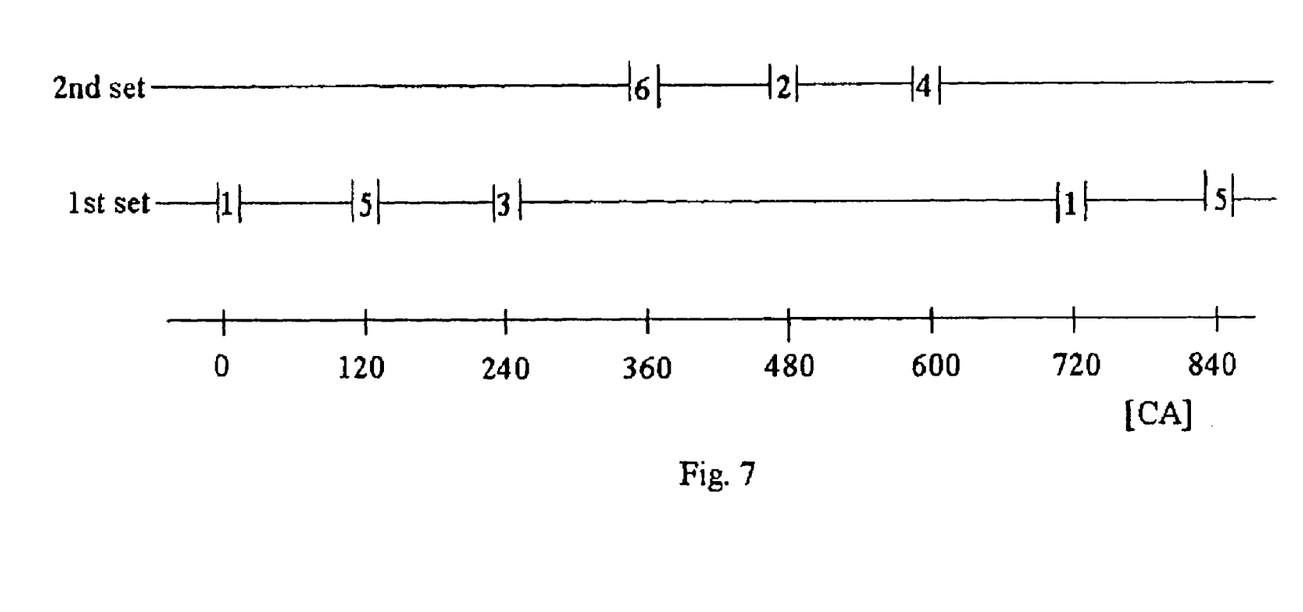
FIG. 7 shows a diagram showing critical stages of the valve lift processes of the engine from FIG. 6.

FIG. 7 shows a diagram of valve lift processes in the engine partly depicted in FIG. 6. The diagram shows critical stages of the valve lift processes, similarly to FIG. 5 referred to above. In each four-stroke cycle and for each set of cylinders there is one large window of approximately 470 CA if a duration of 10 CA is assumed. Thereby, if a valve lift mode shift is requested, this can be effected by activating the first mechanism control system 22 during an interval between critical stages at the third and the first cylinder 3, 1, and activating the second mechanism control system 23 during an interval between critical stages at the fourth and the sixth cylinder 4, 6.

Figure 8:
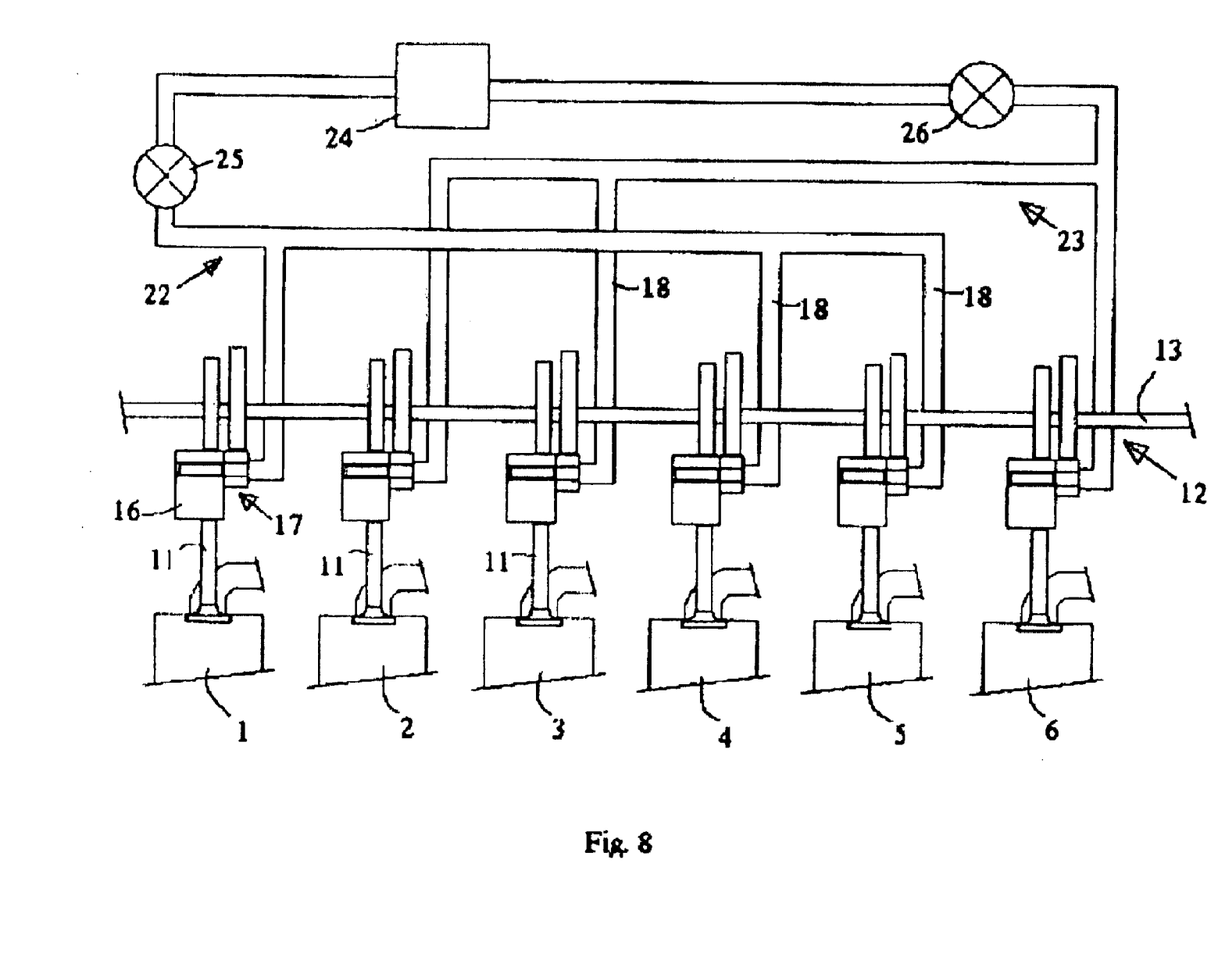
FIG. 8 shows a schematic view of a part of an internal combustion engine according a further embodiment of the invention.

FIG. 8 shows a schematic view of a part of the internal combustion engine according to a further embodiment of the invention, and including the arrangement shown in FIG. 1, 2, and 3. Differing from the embodiments shown in FIG. 4 and 6, a first set of cylinders, controllable through a first mechanism control system 22, includes the first, fourth and fifth cylinder 1, 4, 5 in relation to a first end of the row of cylinders. A second set of cylinders, controllable through a second mechanism control system 23, includes the second, third and sixth cylinder 2, 3, 6 in relation to the first end of the row of cylinders. As in the embodiments described above, ignitions in each set of cylinders are consecutive.

Figure 9:
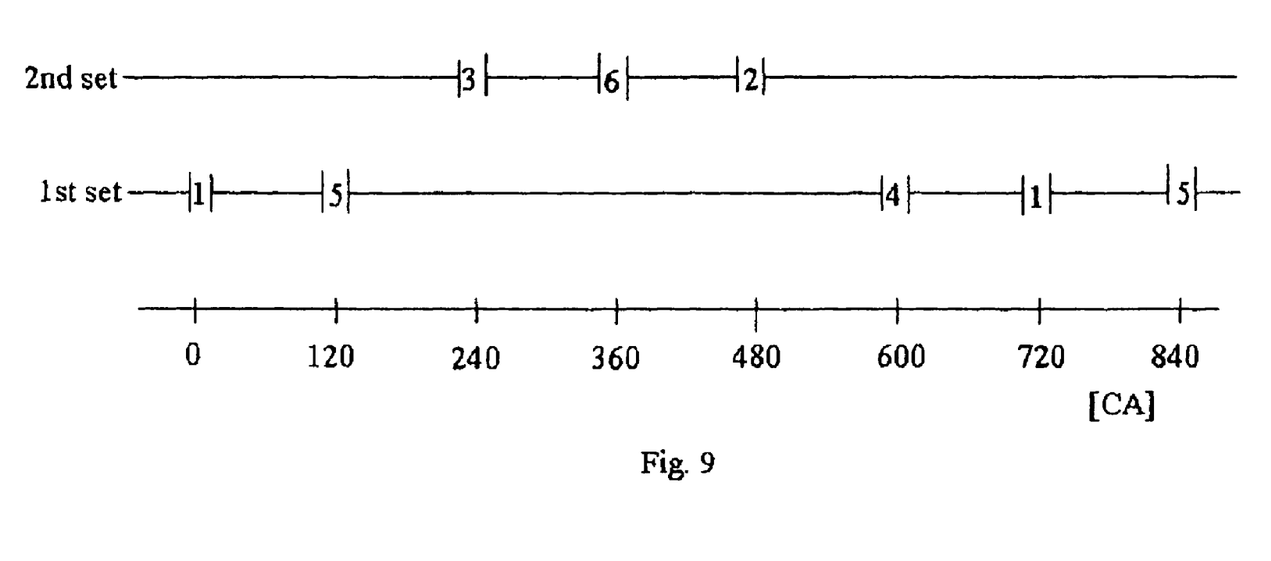
FIG. 9 shows a diagram showing critical stages of the valve lift processes of the engine from FIG. 8.

FIG. 9 shows a diagram of valve lift processes in the engine partly depicted in FIG. 8. The diagram shows critical stages of the valve lift processes, similarly to FIG. 5 and 7 referred to above. In each four-stroke cycle and for each set of cylinders there is a window of approximately 470 CA if a duration of 10 CA is assumed, and if a valve lift mode shift is requested, this can be effected by activating the first mechanism control system 22 during an interval between critical stages at the fifth and the fourth cylinder 5, 4, and activating the second mechanism control system 23 during an interval between critical stages at the second and the third cylinder 2, 3.

It should be pointed out that the embodiment described above with reference to FIG. 4 has special merits in that, in comparison to, e.g., the embodiment described with reference to FIG. 6, it provides for shorter channels in the engine block for the oil galleries 18. Also, it contains less intersections of conduits of separate oil galleries 18, which is an advantage, since these intersections present problems in the design and manufacturing of the engine. Thus, this embodiment will result in a relatively simple design and relatively low manufacturing costs.

It should be pointed out that the invention is applicable to engines with other types of actuation adjustment mechanisms than the type described above. For example, the invention could be used in combination with actuation adjustment mechanisms without a locking device, such as the one described in the patent document U.S. Pat. No. 5,113,813. The merit described above, that the risk of valve mode shifts being effected in stroke cycles other than the ones intended, is present no matter what type of actuation adjustment mechanisms is used for shifting the valve actuation.

From the above, it can be understood that the invention is specially suited for a predefined ignition sequence, and since the ignition sequence can change if the engine operation mode is changed, the arrangement according to invention can be specially adapted for a certain engine operation mode. Above, the invention has been described with reference to an engine operation mode of four stroke cycles, but it could also be adapted to other stroke modes, such as six, eight or twelve stroke modes, where ignition sequences could differ from the four-stroke mode.

Above, the engine described is an inline six-cylinder engine. However, the invention is also applicable to engine with different configurations. For example, it can be used in a V-8 engine, with the ignition sequence 1-5-4-8-6-3-7-2. Also, in a V-12 engine the invention can be used, at which each bank of the engine corresponds to an inline six-cylinder engine. This means that the invention can be applied as described above to each bank of a V-12 engine.

What is claimed is:

1. A control method for selecting and adjusting valve lift in an internal combustion engine with at least two cylinder groups, the method comprising:

a first mode of operation to operate at least one valve in a first group of cylinders, said at least one valve in said first group of cylinders in a first valve lift mode, said first group of cylinders comprised of cylinders that are consecutive in a combustion sequence of said engine;

a second mode of operation to operate said at least one valve in said first group of cylinders in a second valve lift mode;

a third mode of operation to operate at least one valve in a second group of cylinders, said second group of cylinders in a first valve lift mode, said second group of cylinders comprised of cylinders that are consecutive in a combustion sequence of said engine, said second group of cylinders different from said first group of cylinders;

a fourth mode of operation to operate said second group of cylinders in a second valve lift mode; selecting between said first and said second modes of operation during a crank angle interval where valves in said second cylinder group are opened and closed, and activating said selected mode; and selecting between said third and said forth modes of operation during a crank angle interval where valves in said first cylinder group are opened and closed, and activating said selected mode.

2. The method of claim 1 wherein said internal combustion engine is an in-line six-cylinder engine.

3. The method of claim 1 wherein said internal combustion engine is an in-line four-cylinder engine.

4. The method of claim 1 wherein said internal combustion engine is an eight-cylinder engine.

5. The method of claim 1 wherein said valves are electromechanical valves.

6. The method of claim 1 wherein said valves are mechanically actuated valves.

7. An internal combustion engine with a first and a second group of cylinders the internal combustion engine comprising:

a first group of cylinders comprised of cylinders that are consecutive in a combustion sequence of said engine, at least one cylinder of said first group of cylinders having a valve with at least two lift modes;

a second group of cylinders comprised of cylinders that are consecutive in said combustion sequence of said engine, at least one cylinder of said second group of cylinders having a valve with at least two lift modes, said second group different from said first group;

a first means for operating said first cylinder group in a first or second valve lift mode;

a second means for operating said second cylinder group in a first or second valve lift mode.

8. The method of claim 7 wherein said valves are mechanically actuated valves.

9. The method of claim 8 wherein said mechanically actuated valve includes a locking device, and a first and a second position of said locking device, corresponding to a unlocked and a locked position, respectively.

10. The method of claim 7 wherein said valves are electromechanically actuated valves.

11. The method of claim 7 wherein said internal combustion engine is an in-line six-cylinder engine.

12. The method of claim 7 wherein said internal combustion engine is an in-line four-cylinder engine.

13. The method of claim 7 wherein said internal combustion engine is an eight-cylinder engine.

* * * * *